No. 715,465. Patented Dec. 9, 1902.
J. F. DORNFELD.
MALTING DRUM.
(Application filed Aug. 26, 1901.)

(No Model.)

Witnesses.
O. H. Keeney
Erna Schmidt

Inventor.
John F. Dornfeld
By Benedict & Morsell
Attorneys.

THE NORRIS PETERS CO., PHOTO-LITHO., WASHINGTON, D. C.

UNITED STATES PATENT OFFICE.

JOHN F. DORNFELD, OF CHICAGO, ILLINOIS.

MALTING-DRUM.

SPECIFICATION forming part of Letters Patent No. 715,465, dated December 9, 1902.

Application filed August 26, 1901. Serial No. 73,226. (No model.)

*To all whom it may concern:*

Be it known that I, JOHN F. DORNFELD, residing at Chicago, in the county of Cook and State of Illinois, have invented a new and useful Improvement in Malting-Drums, of which the following is a description, reference being had to the accompanying drawings, which are a part of this specification.

My invention has relation to improvements in malting-drums.

The primary object is to provide a construction which shall promote efficiency in work and secure the best results in the process of malting.

A further object is to provide for simplicity in construction and operation and inexpensiveness of production.

With the above and other incidental objects in view the invention consists of the devices and parts or their equivalents, as hereinafter more fully set forth.

Figure 1:
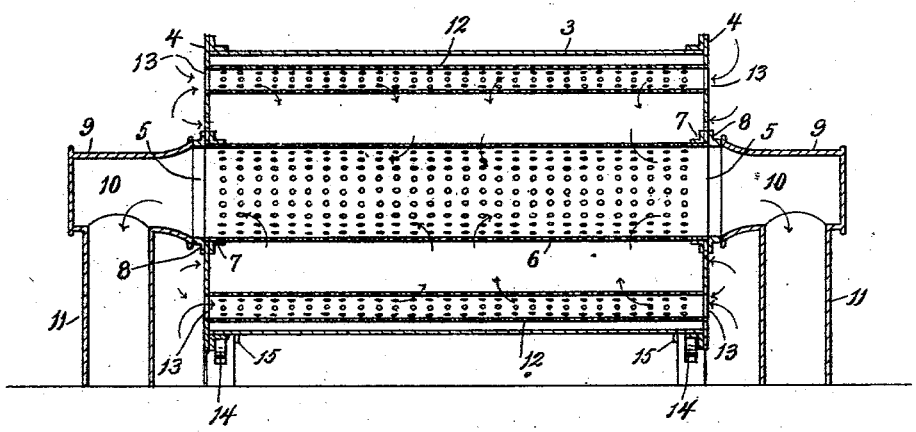
Figure 2:
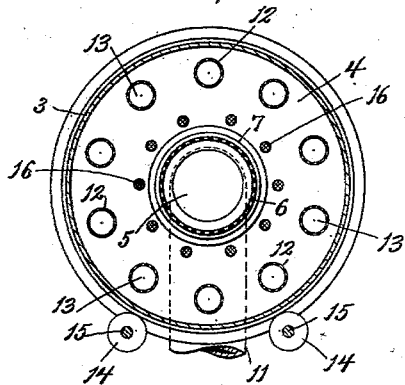

In the accompanying drawings, Figure 1 is a central longitudinal sectional view of a malting-drum embodying my improvements, and Fig. 2 is a cross-sectional view.

Referring to the drawings, the drum is shown as consisting of a cylindrical shell portion 3 and the end pieces or heads 4 4, secured at opposite ends to said cylindrical shell. These end pieces are provided with opposite central openings 5 5, with which the open ends of an interior cylinder 6 communicate, said cylinder provided therearound with a series of small openings or perforations. The ends of the inner cylinder are supported in brackets 7 7, secured to the inside of the end pieces. Secured to the outer side of the end pieces and surrounding the openings 5 5 are short tubular couplings or thimbles 8 8. Fitted to the outer edges of these couplings or thimbles 8 are other tubes or cylinders 9 9, having closed outer ends. These tubes or cylinders form chambers 10 10. Each tube or cylinder 9 has extending therefrom a pipe 11, which connects with a tunnel, duct, room, chamber, or passage, (not shown,) in which may be located a suction-fan (also not shown) or other device for creating a suction or force through the interior cylinder, and thence through the cylinder 9 and pipes 11.

Extending longitudinally of the drum are a series of tubes 12, said tubes being perforated throughout their lengths and having their opposite open ends secured to the end or head pieces of the drum and in communication with openings 13 in said end pieces. The tubes 12 are preferably arranged a short distance from the cylindrical shell of the drum.

The drum may be rotated in any desirable manner, and for supporting the drum I show the rolls 14 14, carried on shafts 15, said rolls bearing against the cylindrical shell and adapted to support the drum when rotating.

While I have shown in the drawings and have heretofore described the interior cylinder 6 as open at both ends, and also the tubes 12 open at both ends, yet I do not wish to be understood as restricting myself to that particular arrangement, inasmuch as the tubes 12 might be open at both ends and the cylinder 6 open at only one end, or, vice versa, the tubes 12 open only at one end and the cylinder 6 open at both ends.

In the operation of my device for germinating purposes the drum is first partly filled with the barley to be germinated and rotation then imparted to the drum. The suction-fans are also started, and this will cause the air to be drawn from the room into the ends of the tubes 12, thence out of the openings of said tubes into and through the germinating grain within the drum, thence through the openings in the cylinder 6, thence drawn longitudinally within the cylinder toward and to the opposite open ends thereof, thence into the chambers 10, and finally down the pipes 11, as clearly illustrated by the arrows on Fig. 1 of the drawings.

Heretofore in the construction of malting-drums longitudinal perforated tubes have been provided which open at one end only into a chamber at the end of the drum—as, for instance, in the construction covered in United States Letters Patent issued to me on May 29, 1900, No. 650,377—or, again, other constructions provide a series of tubes connected with other tubes, chambers, or elbows. The objection to these forms of construction lies in the fact that the air is obstructed or retarded by reason of its passage through a chamber or through a number of pipes or through elbows or crooks before finally reaching the longitudinal tubes, and consequently the supply of air is necessarily rendered uneven and also of a poor quality, inasmuch as the long distance such air is required to travel and its contact with obstructions or with the walls of the tubes cause said air to give off much of its moisture. In my construction, however, where the air enters the longitudinal tubes directly from the room or other place from which the air is taken the said air is only required to pass through a short space before being discharged into the drum, and a better quality of air is thereby constantly and uniformly supplied, and hence better results are accomplished, for the reason that the entire drum is surrounded by a uniform atmosphere. Furthermore, in my construction, as the exhaust can also be extracted from both ends, this permits the exhaust-tubes to be smaller than usual, and as the air also travels a much shorter distance it is less crowded at the ends of the tube, and consequently not so much heat is accumulated as in the case where the entire body of air is passed from one end only.

It has been demonstrated that in systems where the exhaust is extracted at one end of a cylinder or pipe heat will be accumulated at such exhaust end and this heat radiated to the surrounding malt, much to the detriment of the malting process. By my construction, wherein the air is capable of being extracted at both ends of the cylinder, the crowding of such air at one end is thereby avoided, and hence the radiation of heat to the surrounding malt is to a large extent prevented. In addition, however, if desired, a series of small openings 16, preferably screen-covered, may be provided in the ends of the drum and arranged circularly and close to the cylinder 6. These small openings provide for the admission of a special current of cool air through that portion of the grain or malt.

This drum, as shown and described for germinating, may also be used for drying malt and cereals, and the air, which in such a case will be dry air, may pass through the drum in the direction specified or in opposite direction.

What I claim as my invention is—

1. The combination of a stationary room or chamber, a malting-drum located to receive or deliver air therefrom, said drum consisting of a shell portion and connecting end or head pieces, a series of apertured tubes extending longitudinally of the drum from end to end thereof, and each having its opposite ends open and communicating with openings in the ends of the drum, and through said openings with the stationary room or chamber, whereby air is adapted to pass from said room or chamber into the longitudinal tubes, and thence out through the apertures of said tubes into the interior of the drum.

2. The combination of a malting-drum, a series of apertured tubes extending longitudinally of the drum and each having its opposite ends open and communicating with openings in the ends of the drum, and an interior apertured cylinder having an open end communicating with a chamber.

3. The combination of a stationary room or chamber, a malting-drum located to receive or deliver air therefrom, a series of apertured tubes extending longitudinally of the drum from end to end thereof, and each having its opposite ends open and communicating with openings in the ends of the drum, and through said openings with the stationary room or chamber, whereby air is adapted to pass from said room or chamber into the longitudinal tubes: thence out through the apertures of said tubes into the interior of the drum, an interior apertured cylinder having its opposite ends open, and another room or chamber with which said open ends communicate.

4. The combination of a stationary room or chamber, a rotatable malting-drum, a series of apertured tubes extending longitudinally of the drum and open at opposite ends to the exterior of the drum into the stationary room or chamber, an interior apertured cylinder, an exterior cylinder or cylinders unconnected with the drum, but communicating with the interior cylinder, and another room or chamber with which said exterior cylinder or cylinders communicate.

In testimony whereof I affix my signature in presence of two witnesses.

JOHN F. DORNFELD.

Witnesses:
A. L. MORSELL,
C. H. KEENEY.